(12) United States Patent
Zandifar et al.

(10) Patent No.: US 7,873,216 B2
(45) Date of Patent: Jan. 18, 2011

(54) DISTORTION CORRECTION OF A SCANNED IMAGE

(75) Inventors: Ali Zandifar, Cupertino, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 996 days.

(21) Appl. No.: 11/679,648

(22) Filed: Feb. 27, 2007

(65) Prior Publication Data

US 2008/0205759 A1 Aug. 28, 2008

(51) Int. Cl.
*G06K 9/34* (2006.01)
(52) U.S. Cl. .................................................. 382/177
(58) Field of Classification Search .................. 382/177
See application file for complete search history.

(56) References Cited

U.S. PATENT DOCUMENTS

| 5,497,236 | A | 3/1996 | Wolff et al. |
| 5,854,854 | A | 12/1998 | Cullen et al. |
| 5,940,544 | A | 8/1999 | Nako |
| 6,330,050 | B1 | 12/2001 | Takahashi et al. |
| 6,816,624 | B1 | 11/2004 | Ebisawa et al. |
| 6,885,479 | B1 | 4/2005 | Pilu |
| 6,954,290 | B1 | 10/2005 | Braudaway et al. |
| 2002/0054372 | A1 | 5/2002 | Takahashi |

OTHER PUBLICATIONS

P. Kakumanu; N. Bourbakis; J. Black; S. Panchanathan; , "Document Image Dewarping Based on Line Estimation for Visually Impaired," Tools with Artificial Intelligence, 2006. ICTAI '06 pp. 625-631. Nov. 2006.*
Chaudhuri, A.; Chaudhuri, S.; , "Robust detection of skew in document images," Image Processing, IEEE Transactions on , vol. 6, No. 2, pp. 344-349, Feb. 1997.*

* cited by examiner

*Primary Examiner*—Bhavesh M Mehta
*Assistant Examiner*—Nirav G Patel

(57) ABSTRACT

Disclosed are embodiments of systems and methods for eliminating or reducing the distortion in a scanned image. In embodiments, the image is segmented into foreground and background pixels. Foreground pixels may be grouped into "letters." Using index-based searching, "letters" may be grouped into "words" and "words" may be grouped into baselines. One or more dominant baselines may be selected and the characteristics of the dominant baseline or baselines may be used to unwarp the image.

20 Claims, 14 Drawing Sheets

Binarized image

Extracted Letter Rectangles with Indexing Grid

Word rectangle and orientation extraction using ellipse fitting

Nearest Neighbors for a Word Rectangle Using Grid Indexing

Smoothed word rectangle orientations

Word Grouping to Form a Baseline

Scanned image

Binarized Image

Baseline Estimation for the Image
(divided into Three Zones)

Reduced-Distortion Image

DISTORTION CORRECTION OF A SCANNED IMAGE

BACKGROUND

A. Technical Field

The present invention pertains generally to image processing, and relates more particularly to systems and methods for removing or reducing the distortion from a scanned image.

B. Background of the Invention

When a copy of a document is desired, a photocopier or scanner is typically used to duplicate the document. The photocopier, scanner, or other such apparatus with image capturing capabilities generates an image of the document. The image may comprise an array of pixels, wherein each pixel has a location within the image and a color value. When taken together in their proper position within the array, the pixels form the image.

A measure of the quality of the image is the degree to which it is an accurate copy of the document. Problems or circumstances may occur that result in the creation of an image that is a distorted version of the document.

A common situation that results in a distorted image occurs when the page of a bound volume is copied—particularly when copied using flatbed scanning. Because the binding of the volume restricts the physical layout of the book, it is not always possible to place the entire page of the bound volume against the scanning surface. The portion of the page proximate to the binding or spine curves away from the scanning surface and may result in an image with distortions.

Often, the content of the page undergoes two major sources of degradation or distortion. First, the portion of the page running along the spine of the volume typically appears shaded. And second, lines, such as lines of text, appear curved because of the curvature of the volume.

It is typically preferred that the image has as few distortions as possible. Accordingly, what is needed are systems and methods to remove or reduce the distortion in a copy of a document.

SUMMARY OF THE INVENTION

Disclosed are embodiments of systems and methods for removing or reducing the distortion in a scanned image. According to aspects of the present invention, systems and methods are presented for removing or reducing distortion in an image, including straightening of curved image portions and the removal or reduction of shading in the image.

In embodiments, a scanned image may be binarized. As part of the binarizing of the input image or as a subsequent process, shading of the scanned image may be removed. Using connected component analysis, the binarized image may used to form connected component groups which shall be referred to herein as "letters." A "letter" as used herein shall mean any connected component group regardless of whether that group forms a legible character, lexical mark, symbol, figure, or portion thereof.

In embodiments, the letters may then be formed into "words" using an index of the letter. In an embodiment, the image may be divided into a grid and the letters may be labeled and indexed according to the grid. When forming words, the index may be used to quickly identify a neighborhood of letters in proximity to a letter. It shall be noted that the term "word" shall be construed to mean one or more "letters" that have been grouped together regardless of whether that group forms a legible word or a portion thereof. In embodiments, the orientation of a word may be smoothed by examining words within a neighborhood of the word under examination.

In embodiments, the words may be formed into baselines using an index. In an embodiment, the image may be divided into a grid and the words may be labeled and indexed according to the grid. The grid may be the same or different as the grid used for indexing the letters. When forming words, the index may be used to quickly identify a neighborhood of words in proximity to a word.

In embodiments, one or more baselines may be formed, and the baselines may be examined to identify one or more dominant baselines. In an embodiment, the characteristics of the baselines may be obtained by fitting a function, such as a polynomial, to a baseline and the polynomial characteristics may be used to select one or more baselines as dominant baselines. The characteristics of the dominant baseline or baselines may then be used to unwarp the image.

In embodiments, a system for reducing distortion in an image comprising pixels may comprise a preprocessor that binarizes the image into foreground and background pixels; a labeler that forms the foreground pixels into letters; a document image layout extraction system that forms the letters into indexed letter regions, uses index-based searching to form the indexed letter regions into indexed words, and uses index-based searching to form the indexed words into baselines; a document layout and baseline estimator that fits a function to at least some of the baselines and selects one or more dominant functions based on the functions; and an unwarper that, responsive to a pixel in the image being located between two dominant functions, unwarps the pixel by blending the two dominant functions, and responsive to a pixel in the image not being located between two dominant functions, unwarps the pixel in relation to a nearest dominant function and a shift related to a distance between the pixel's location and the nearest dominant function.

In embodiments, the document image layout extraction system may comprise a letter segmenter that forms a region around each letter, labels each region, forms a letter indexing grid, and indexing a location of each of the labeled letter regions according to its position within the letter indexing grid; a fast word segmenter that forms words using the indexed letter regions to identify a neighborhood of letters for a query letter and forms into a word the letters from the neighborhood of letters that are less than a threshold distance apart; a word orientation estimator that estimates a location and orientation for each word and indexes the location of each word; and a fast word grouper that forms baselines using the indexed words to identify a neighborhood of words for a query word and forms into a baseline the words from the neighborhood of words that lay on a projection of the query word along its orientation.

In embodiments, the document image layout extraction system may further comprise an orientation smoother that adjusts the orientation of a word based upon the orientations of at least some of its neighboring words.

It should be noted that the present invention may be implemented in any device or system that may be used to scan an image or obtain a scanned image, including without limitation, general or specialized computers, workstations, scanners, multifunction printers, and the like. Aspects of the present invention may be implemented in a wide variety of ways including software, hardware, firmware, or combinations thereof. For example, the functions to practice various aspects of the present invention may be performed by components that are implemented in a wide variety of ways, including discrete logic components, one or more application specific integrated circuits (ASICs), and/or a program or programs of instructions for execution by one or more program-controlled processors. It shall be noted that the manner in which the present invention is implemented is not critical.

Some features and advantages of the invention have been generally described in this summary section; however, additional or different features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices. The embodiments of the present invention may be implemented in software, hardware, firmware, or combinations thereof. Components, or modules, shown below in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component. Furthermore, the components may comprise additional functionality, including additional functionality to support the disclosed functionality.

Connections between components within the figures are not intended to be limited to direct connections. Rather, data between these components may be modified, re-formatted, or otherwise changed by intermediary components. Also, additional or fewer connections may be used. It shall also be noted that the terms "coupled," "communicatively coupled," "receives as an input," "coupled to receive information," or the like shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention but may be in more than one embodiment. Also, the appearances of the phrase "in one embodiment" or "in an embodiment" in various places in the specification are not necessarily all referring to the same embodiment. It shall be noted that a set or a group need not contain a plurality of members of the set or the group. It shall also be noted that a point may comprise one or more pixels.

Aspects of the present invention comprise systems and methods for eliminating or reducing the distortion in a scanned image. A scanned image shall be construed to mean a digital version of a hard copy document, that is, a physical medium, e.g., paper, document obtained from a scanner, printer, copier, facsimile machine, or camera. Thus, the terms "scanned document" or "scanned image" as used herein shall mean a digital document generated from a physical document by any of the above-referenced means or by other means.

Figure 1:
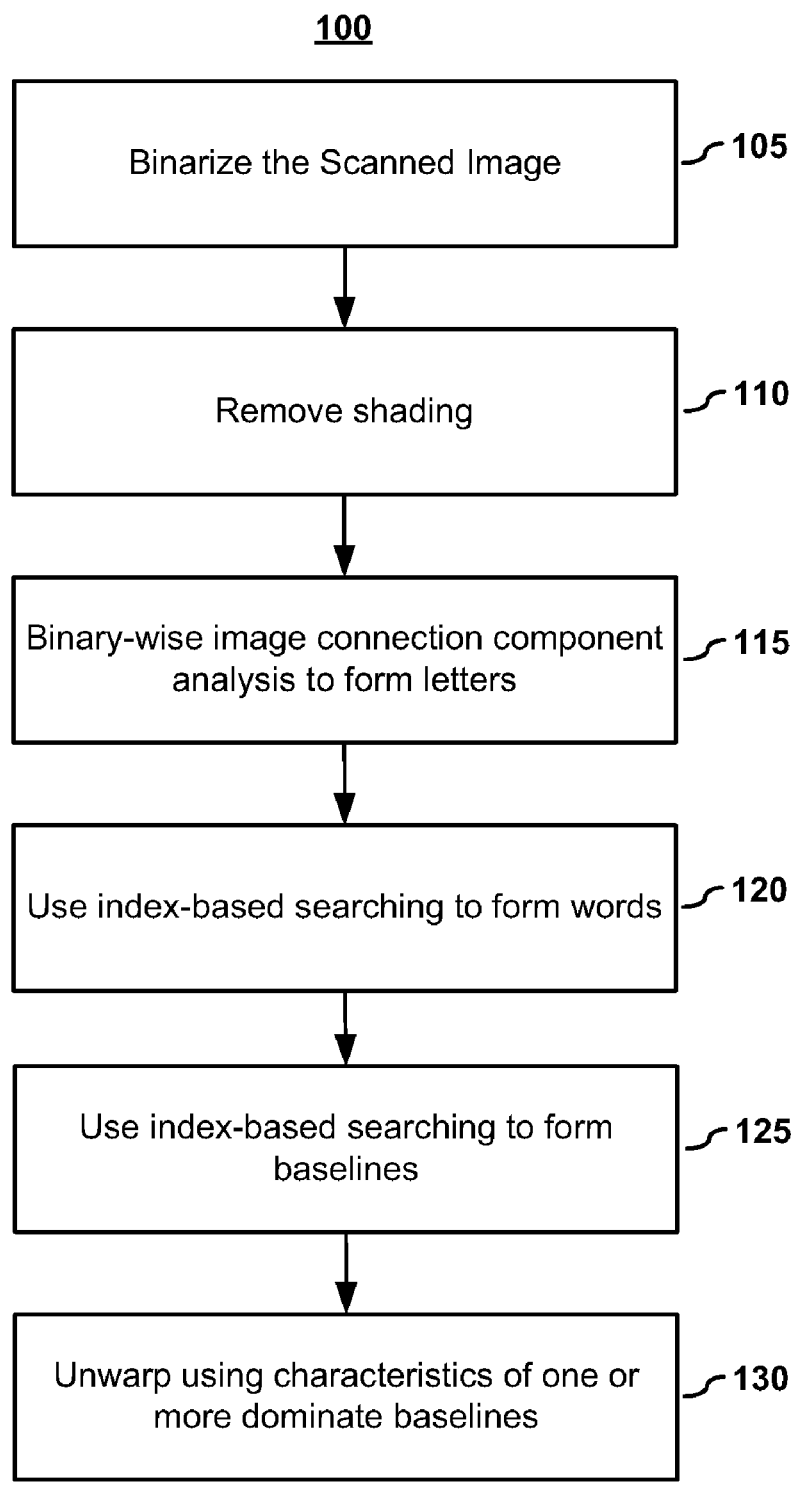
FIG. 1 illustrates an exemplary method for reducing or removing distortion from a scanned image according to an embodiment of the invention.

FIG. 1 illustrates an exemplary method 100 for reducing or removing distortion from a scanned image according to an embodiment of the invention. In the depicted embodiment, a scanned image may be binarized (105). One skilled in the art shall recognize that one or more adaptive thresholding or segmentation algorithms may be used to binarize the image. It shall be noted that no binarization method is critical to the present invention.

In embodiments, as part of the binarizing of the input image or as a subsequent process, shading of the scanned image may be removed (110). Shading typically occurs when the page of a bound book is copied using a flatbed scanner. Because the binding of the book restricts the physical layout of the book, the portion of the page along the binding of the book usually curves away from the scanning surface resulting in shading in that area. For example, FIG. 18 graphically depicts an example of scanned image 1805 of a bound volume. Note the shading 1810, which is particularly prevalent along the binding side of the page.

Returning to FIG. 1, using binary-wise connected component analysis, the binarized image may used to form (115) letters. It should be noted that the term "letters" is being used because one application of the present invention is the removal of distortion from scanned image of pages with text. However, it shall be noted that the term "letter" shall be construed herein to have a broader meaning. A "letter" as used herein shall mean any connected component group regardless of whether that group forms a legible character, lexical mark, symbol, figure, or portion thereof.

In embodiments, the letters may then be formed (120) into "words" using an index of the letter. In an embodiment, the image may be divided into a grid and the letters may be labeled and indexed according to the grid. When forming words, the index may be used to quickly identify a neighborhood of letters in proximity to a letter. It shall be noted that the term "word" shall be construed herein to have a broader meaning. A "word" as used herein shall mean one or more "letters" that have been grouped together regardless of whether that group forms a legible word. In embodiments, the orientation of a word may be smoothed by examining words within a neighborhood of the word under examination.

In embodiments, the words may then be formed (125) into baselines using an index. In an embodiment, the image may be divided into a grid and the words may be labeled and indexed according to the grid. The grid may be the same or different as the grid used for indexing the letters. When forming words, the index may be used to quickly identify a neighborhood of words in proximity to a word.

In embodiments, one or more baselines may be formed, and the baselines may be examined to identify one or more dominant baselines. In an embodiment, the characteristics of the baselines may be obtained by fitting a function, such as a polynomial, to a baseline and the polynomial characteristics may be used to select one or more baselines as dominant baselines. The characteristics of the dominant baseline or baselines may then be used to unwarp (130) the image.

Embodiments of the present invention may be considered to be based upon three main processes. A first process may involve document layout extraction. In embodiments, document layout information may include labels, locations, and orientations of letters, words, and baselines. A second process may involve estimating region-based polynomial characteristics. A third step may involve unwarping the input image based on the input document image layout and regional polynomial characteristics, which may also be referred to herein as unwarping characteristics. Additional details, including additional embodiments, are presented below.

Figure 2:
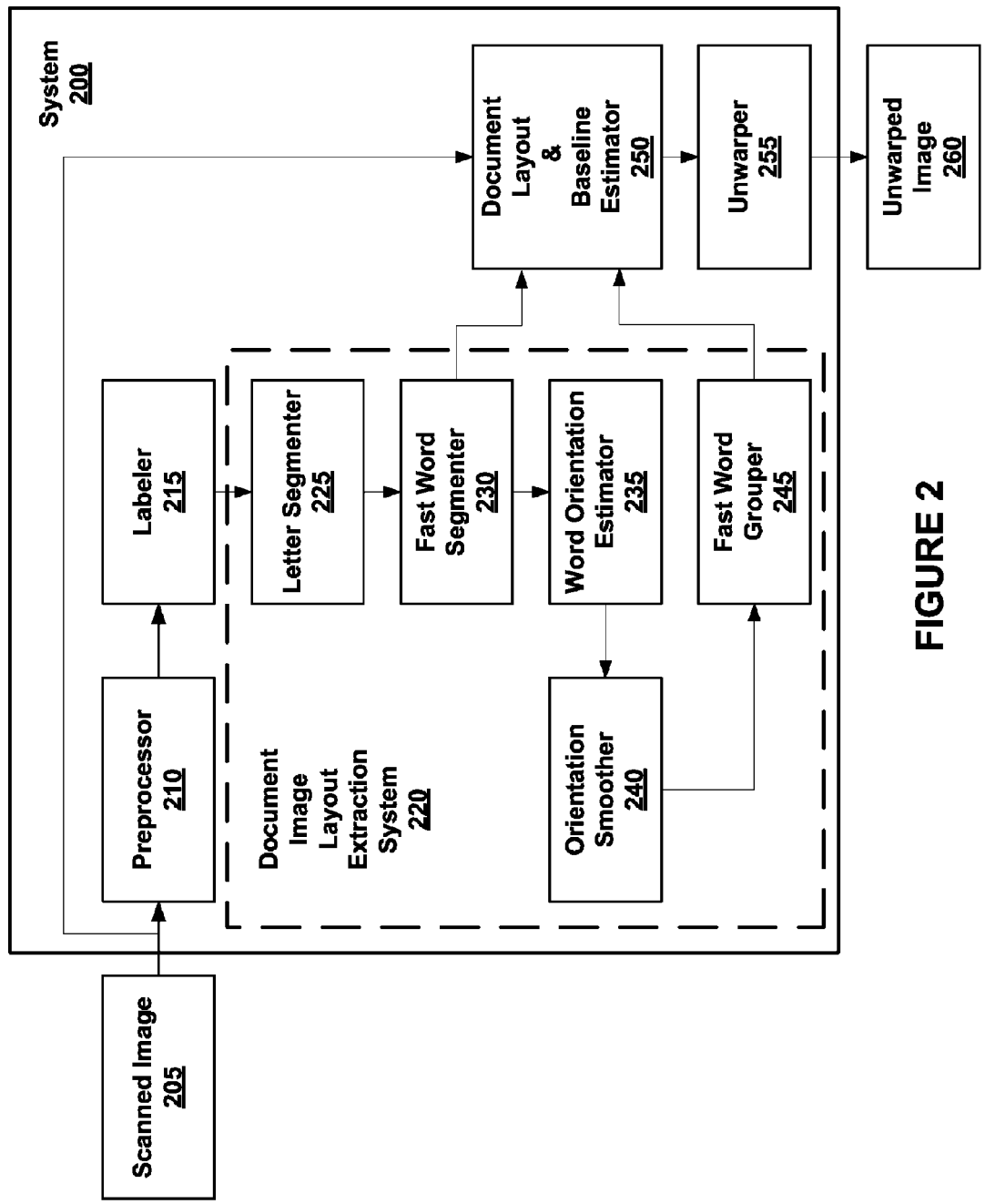
FIG. 2 depicts an embodiment of a system for reducing or removing distortion from a scanned image according to an embodiment of the invention.

FIG. 2 depicts an embodiment of a system that may be employed to remove or reduce the distortion in a scanned input image according to an embodiment of the present invention. In the depicted embodiment of FIG. 2, a preprocessor 210 of system 200 may receive a scanned image 205 and remove shading from the input image 205. In embodiments, letter labels may be segmented by labeler 215. The corresponding document image layout may be extracted by the components that comprise the document image layout extraction system 220, which is identified in FIG. 2 by the dotted region. In the illustrated embodiment, document image layout extraction system 205 may comprise a letter segmenter 225, a fast word segmenter 230, word orientation estimator 235, an orientation smoother 240, and a fast word grouper 245. In the depicted embodiment, the output of the document image layout extraction system 220 may be provided to document layout and baseline estimator 250 that may receive letter list, word list, and baseline list information, and the input image 205. Given the input scanned image 205 and the unwarping characteristics obtained from the document layout and baseline estimator 250, one or more portions of the image may then be straightened, or unwarped by unwarper 255. Each of the foregoing components shall be described in more detail below.

1. Preprocessor

In an embodiment, the input to the preprocessor 210 may be a scanned image 250 and the output may be a binarized or segmented image. In an embodiment, the binarized image may comprise segmented letters and may have the background removed. One skilled in the art shall recognize that the output of the preprocessor may be segmented letters.

In an embodiment, the preprocessor 210 may binarize the image using an adaptive thresholding scheme. Global thresholding methods, in contrast with adaptive thresholding methods, typically involve computing a threshold value for an entire image from the two modes on a histogram of the image. However, such methods are insufficient because in a scanned input image, the image histogram typically does not have two modes. Using an adaptive thresholding method instead of using a traditional global binarization scheme is beneficial because it allows for some compensation related to the variations in background due to shading.

In embodiments, adaptive binarization may perform binarization at each image pixel locally. In one embodiment, a threshold may be set for a portion of the image and that threshold may be used to binarize that portion of the image or a subset thereof. Consider by way of illustration and not limitation the following embodiment. Assume that W(x,y) is a local window around a pixel in the image. Local adaptive thresholding allows for the selection an individual threshold for the local window, W(x,y), based on the histogram of the pixels within the local window, W(x,y). Thus, portions of the image may be processed independent of other portions of the image. It shall be noted that such local thresholding allows for thresholding of an image whose global intensity histogram does not contain two distinctive modes that may be used to binarize the image.

In embodiments, documents with different color profiles (e.g., enriched color images) and/or different layout profiles (text/graphics) may also be binarized. In an embodiment, the image may be converted to gray scale or black and white and binarized. In an alternative embodiment, one or more segmentation methods may be used instead of or in conjunction with an adaptive binarization scheme. In an embodiment, one or more segmentation or pixel labeling methods described in commonly-assigned U.S. patent application Ser. No. 11/202,720, filed on Aug. 12, 2005, entitled "LABEL AIDED COPY ENHANCEMENT," by Anoop K. Bhattacharjya (the subject matter of which is incorporated herein by reference in its entirety), may be used to segment the image into foreground and background pixels. One skilled in the art shall recognize that other segmentation or binarization methods may be used to binarize the image. No particular method of binarizing the image is critical to the present invention.

Figure 3:
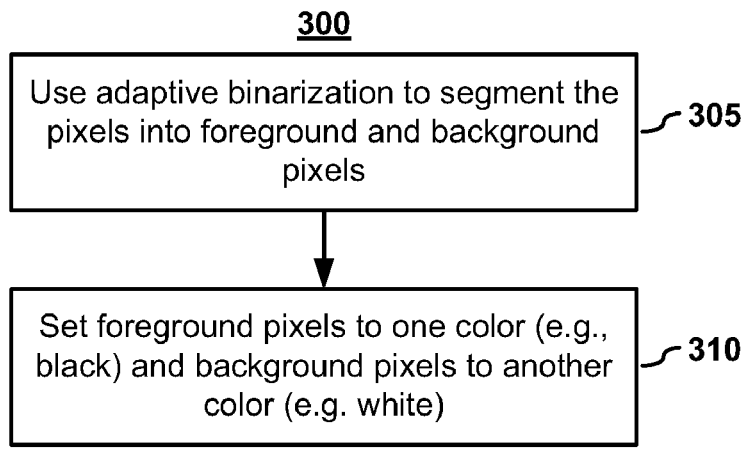
FIG. 3 depicts an exemplary method for segmenting the pixels of an input image into groups according to an embodiment of the invention.

FIG. 3 depicts an embodiment of a method 300 for segmenting or binarizing the input image 205 according to an embodiment of the present invention. As illustrated in FIG. 3, in an embodiment, adaptive binarization may be used to segment (305) the input image 205 into foreground and background pixels. Foreground pixels may be set (310) to one color, such as black, and background pixels may be set (310) to another color, such as white.

Figure 18:
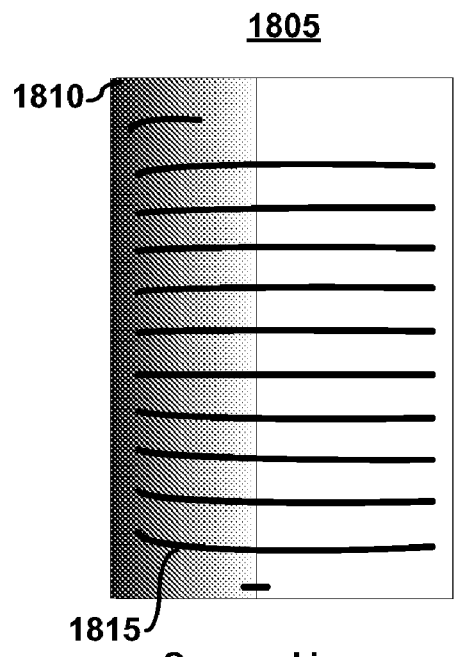
FIG. 18 depicts an example of a scanned input image that exhibits distortion from both shading and warping.
Figure 19:
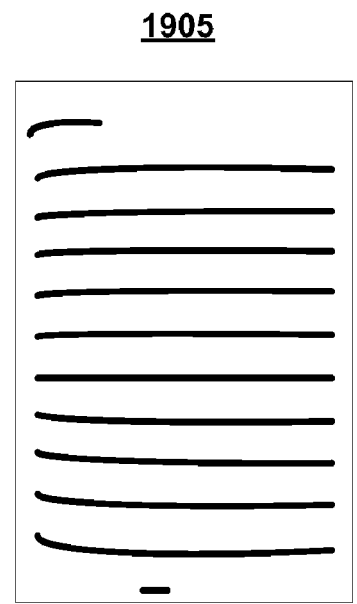
FIG. 19 depicts the scanned input image of FIG. 18 that has been binarized according to an embodiment of the present invention.

It should also be noted that one aspect of the binarization is the removal or reduction in shading. By segmenting the image into foreground and background and setting all of the background pixels to a single color, the shading is removed. For example, FIG. 18 depicts an example of a scanned image 1805. The scanned image 1805 possesses shading 1810 as a result of scanning the document. FIG. 19 depicts the binarized image 1905 of the scanned image 1805 in which it can be seen that the shading has been reduced or removed according to the teachings of the present invention.

2. Labeler

Figure 4:
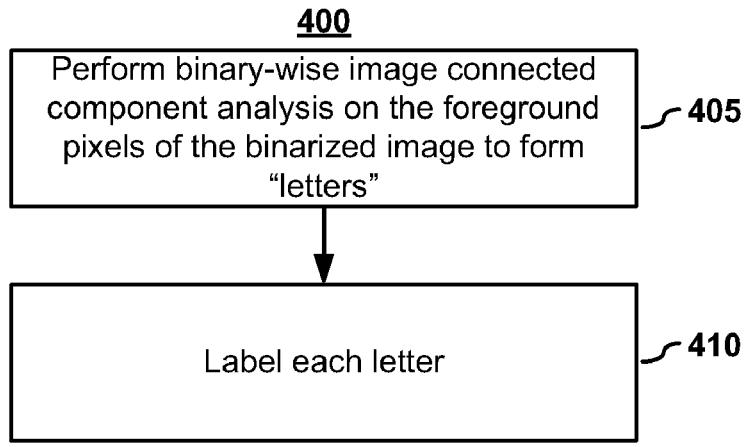
FIG. 4 depicts an exemplary method for grouping pixels of an input image into "letter" groups and labeling the letters according to an embodiment of the invention.

In embodiments, the labeler 215 may receive as an input the segmented pixels of the binarized image, and the labeler 215 may output labeled letters for further use in system 200. FIG. 4 depicts an embodiment of a method for grouping pixels of an input image into "letters" and labeling the letters according to an embodiment of the invention. In one embodiment, labeler 215 receives the binarized image and performs a binary-wise image connected component analysis on the foreground pixels of the binarized image to form (405) "letters." As noted above, the term "letter" as used herein shall mean any connected component group of pixels regardless of whether that group forms a legible character, lexical mark, symbol, figure, or portion thereof. As depicted in the illustrated embodiment of FIG. 4, each letter may be assigned (410) one or more labels.

3. Letter Segmentation

Figure 5:
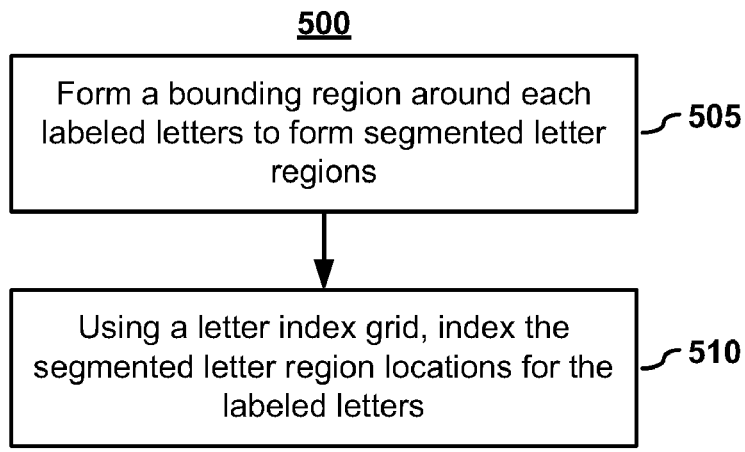
FIG. 5 depicts an exemplary method for indexing the labeled letters according to an embodiment of the invention.

In embodiments, letter segmentation module, or letter segmentor, 225 may receive as an input the labeled letters and the binarized image and may output segmented letter regions including location information. FIG. 5 depicts an embodiment of a method for indexing the labeled letters according to an embodiment of the invention. Each connected component group, or letter, may be bounded by a bounding region to form (505) a segmented letter region. In embodiments described herein, the bounding region may be a rectangle although it shall be noted that other bounding regions may be employed. In an embodiment, a rectangle may be formed by finding the tightest bounding rectangle. In one embodiment, the maximum and minimum pixel locations (left, right, top, and bottom) for the letter may be used to form the rectangle. It shall also be noted that other methods may be used to fit a region to a connected component group, that the region need not be a bounding region, and that no particular region fitting method is critical to the present invention.

Using an index grid, which may be referred to herein as the letter index grid, each of the labeled letter rectangle's location may be indexed (510). In an embodiment, if a letter rectangle spans more than one grid location, the letter rectangle may be associated with each of those grid locations. As will be discussed below, this index of the labeled letters' locations may be used to speed subsequent processes.

Figures 6A, 6B:
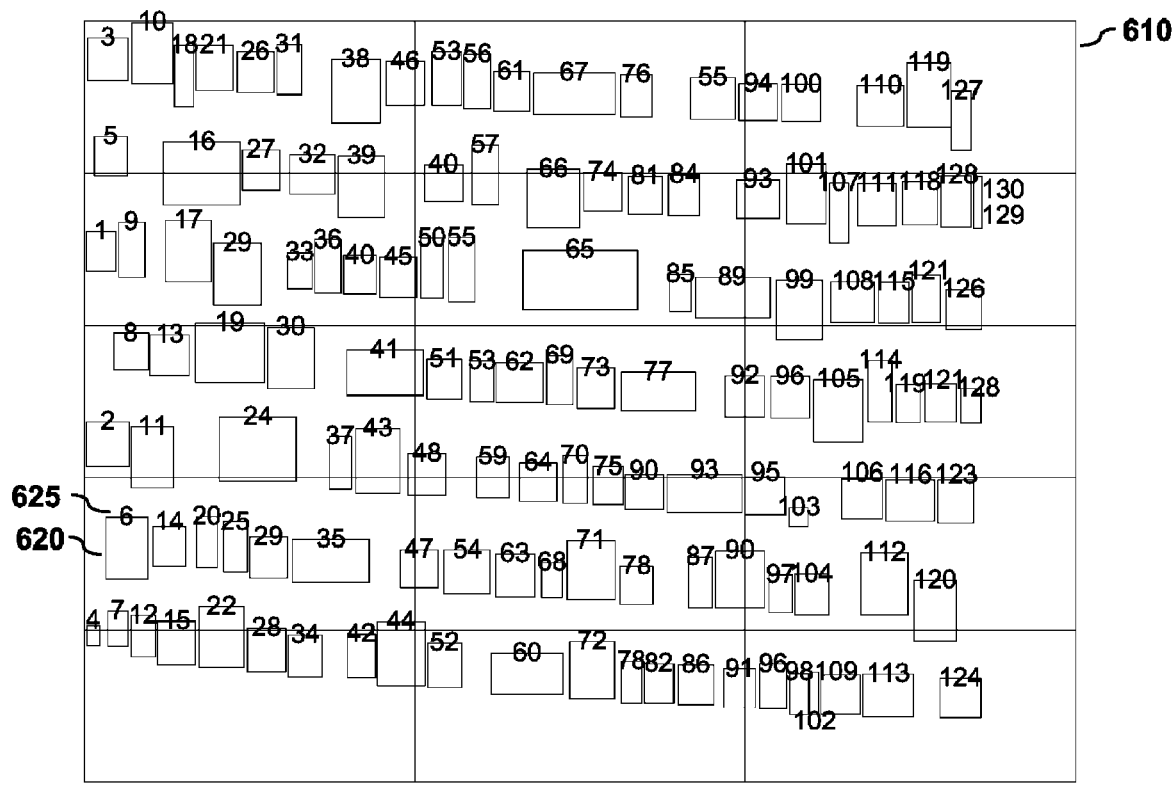
FIG. 6A depicts, for purposes of illustration, a portion of an exemplary binarized image according to an embodiment of the invention.
FIG. 6B depicts, for purposes of illustration, labeled letters extracted from the exemplary binarized image of FIG. 6A and a letter index grid according to an embodiment of the invention.

FIG. 6A depicts, for purposes of illustration, a portion of a binarized image 605 according to an embodiment of the invention. FIG. 6B depicts, for purposes of illustration, labeled letters extracted from the binarized image of FIG. 6A and a letter index grid 610 according to an embodiment of the invention. It should be noted that each letter has a letter rectangle 620 and a letter label 625. It shall be noted that no particular indexing method or grid layout is critical to the present invention.

In embodiments, to more precisely identify certain letter groups, grouping of letters regions may be performed. In an embodiment, if letter regions are within a threshold distance, the letters may be joined into a single "letter." Because certain characters, particularly some language characters (e.g., English, Japanese, and Chinese characters), are formed of more than one connected component group, it may be beneficial to join them together. Typically, the marks that form these characters are closely spaced. Thus, in embodiments, letter rectangles that are within a threshold distance, such as (by way of example and not limitation) within 2-5 pixels, may be treated as a single letter. In an embodiment, the letters may be treated as a single letter by merging their letter regions. In an alternative embodiment, the letters may be treated as a single letter by forming a new bounding region that bounds both connected component groups.

In embodiments, the single letter threshold distance may be preset or may be determined by examining the spacing of the letters. In an embodiment, the single letter threshold distance may be set by examining the spacing distribution, wherein modal distributions may indicate one or more distances that may be used as a threshold distance or distances.

4. Fast Word Segmentation

In embodiments, fast word segmenter 230 may receive as an input the labeled letter and the index information and may output labeled words. As noted above, a "word" as used herein shall mean one or more "letters" that have been grouped together regardless of whether that group forms a legible word or portion thereof.

Figure 7:
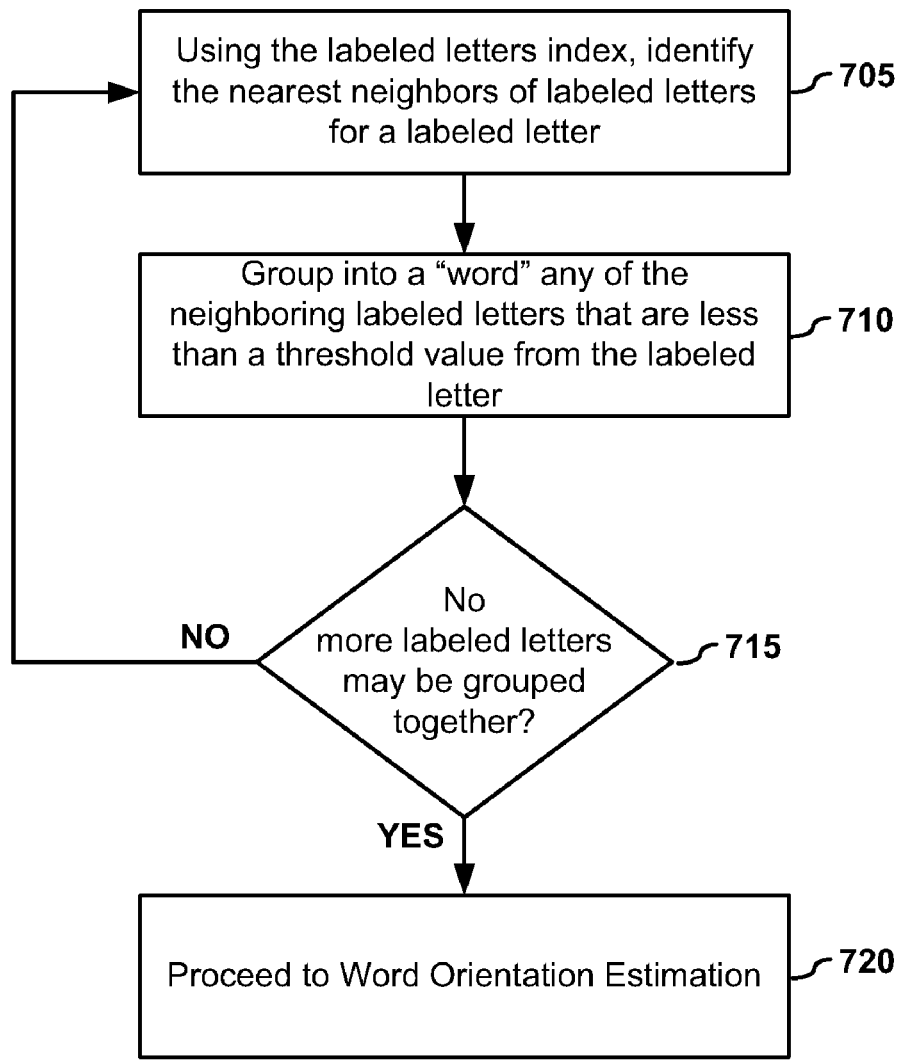
FIG. 7 depicts an exemplary method for grouping indexed labeled letters into "word" groups according to an embodiment of the invention.

FIG. 7 depicts an exemplary method for grouping indexed labeled letters into "word" groups according to an embodiment of the invention. As depicted in FIG. 7, to speed the letter grouping, the index of the letter rectangles may be used. In an embodiment, for each cell in a grid, the corresponding rectangles list is known, and for any letter rectangle, all cells intersected by that letter rectangle are also known. Therefore, for a query letter, finding its neighbors may be done quickly because exhaustive searches need not be performed. In an embodiment, the neighbors may represent the K-nearest neighbors (KNN) of a letter. Thus, using the labeled letters index, the neighbors of a letter may be quickly identified (705). In an embodiment, letters may be grouped (710) together into a "word" if the minimum distance between the neighboring letters is less than a threshold value. In an embodiment, the query letter may be joined with one or more letters that are within a threshold distance forming a new letter group that may be joined with one or more letters that are within a threshold distance. In an embodiment, the merging may continue until there are no more letter that are within the threshold distance. As with the letter labels, the threshold value may be preset or determined by examining the distribution of the letter rectangles. It shall be noted that for each word, the corresponding letter label or labels that form that word are known.

In an embodiment, grouping of the labeled letters into words may be recursively performed until each letter label has been examined. In the embodiment depicted in FIG. 7, a check may be made to determine (715) whether no more labeled letter may be grouped together. If more labeled letters might be joined, the previous steps 705, 710 may be performed. If no more labeled letter may be grouped together, the word grouping is concluded and the process may proceed to word orientation estimation (720).

5. Word Orientation Estimator

In embodiments, word orientation estimator 235 may receive as an input the word information and output word rectangles and their orientations. In an embodiment, a word rectangle location and its orientation may be estimated by fitting an ellipse to the image points that form the word.

Figure 8:
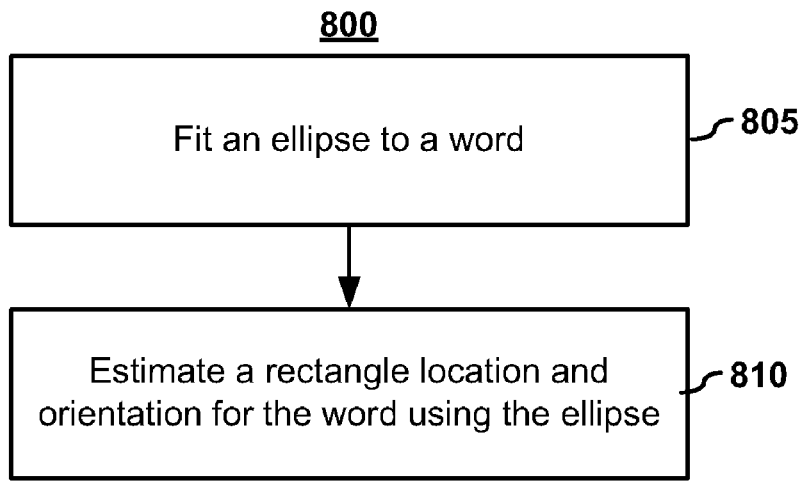
FIG. 8 depicts an exemplary method for estimating a word rectangle and orientation according to an embodiment of the invention.

FIG. 8 depicts an exemplary method for estimating a word rectangle and orientation according to an embodiment of the invention. Recall that for each word, the labeled letters that form that word and their corresponding image points are known. Using the image information, an ellipse may be fit (805) to a word. An ellipse function may be generalized as $\|ax^2+bxy+cy^2+dx+ey+f\|$, wherein the ellipse parameters are a, b, c, d, e and f. In an embodiment, ellipse fitting may be performed by fitting an ellipse to a set of two-dimensional points using a least-squares fitting. The two-dimensional points may be the points belonging to the letters that form a word. One skilled in the art shall recognize that other fitting methods may also be employed. It shall be noted that no particular fitting method is critical to the present invention. The ellipse may be used to estimate (810) a rectangle location and orientation for the word.

Figure 10:
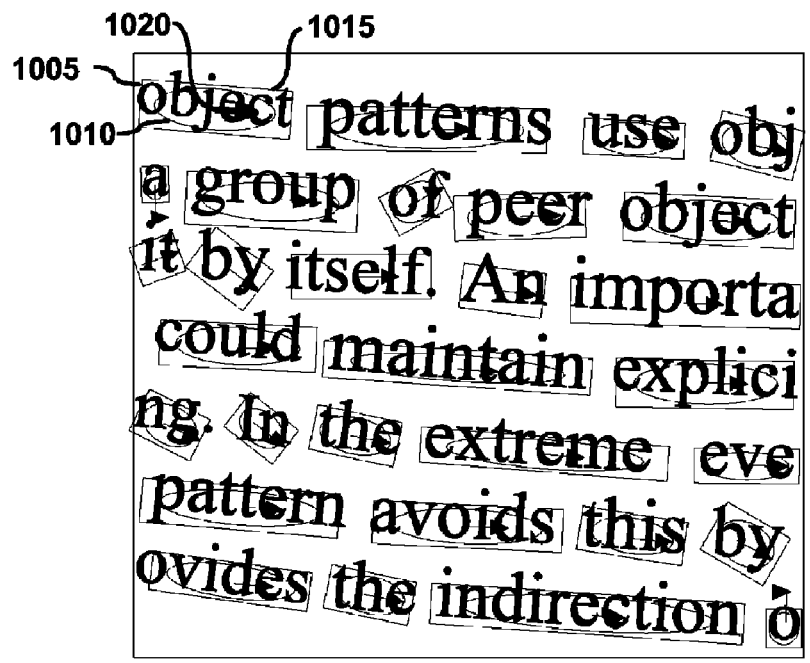
FIG. 10 depicts, for purposes of illustration, word rectangle and orientation extraction using ellipse fitting according to an embodiment of the invention.

FIG. 10 depicts, for purposes of illustration, word rectangles and orientations extracted using ellipse fitting according to an embodiment of the invention. For example, the pixels that form each of the labeled letters (labeled letters 3, 10, 18, 21, 26, and 31 of FIG. 6B) that form the word "object" 1005 may be used to fit an ellipse 1010. In an embodiment, ellipse 1010 may be fit to the pixels that form word 1005. The ellipse 1010 may be used to fit a rectangle 1015 to the word 1005. The orientation 1020 may be obtained from an axis of the ellipse 1010 or from the fitted rectangle 1015. One skilled in the art shall recognize that, given the image information for a word, different methods may be employed to estimate the word's location and orientation. It shall be noted that no particular method for estimating a word's location and orientation is critical to the practice of the present invention.

6. Word Orientation Smoothing

In embodiments, orientation smoother 240 may receive as an input the word information, including estimated word locations and orientations, and smooth the word rectangle locations and orientations. Because a word rectangle's orientation is estimated, not all word orientations may sufficiently reflect the proper orientation of the word. For example, the ellipse fitting method is less effective for estimating the orientation for some content, particularly small marks and short words (e.g., "a," "of," "if," "by," and the like). Therefore, in embodiments, to achieve improved orientation estimation, one or more of the word rectangle orientations may be smoothed based on the orientations of one or more of the surrounding words.

Figure 9:
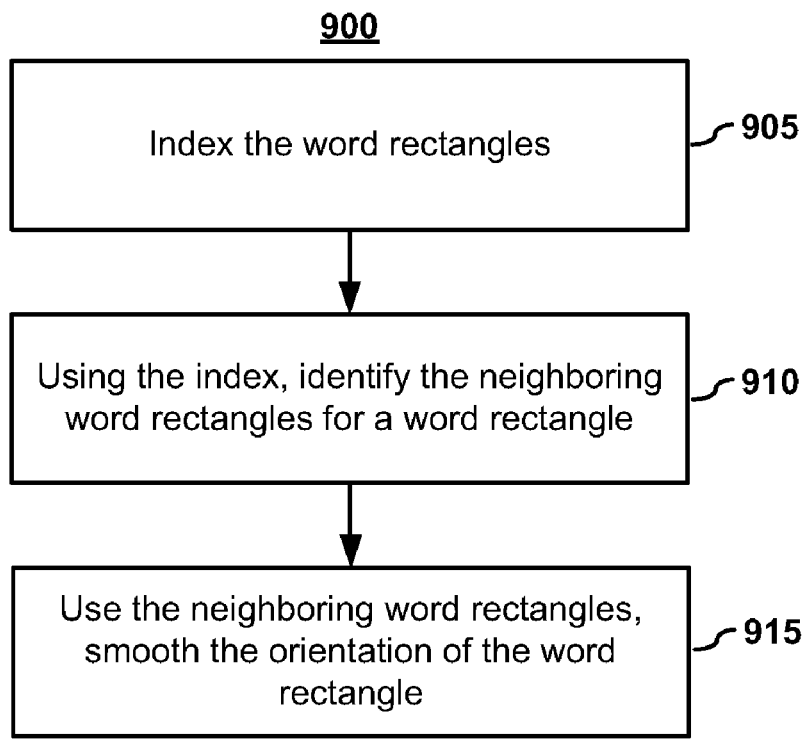
FIG. 9 depicts an exemplary embodiment for adjusting a word's orientation using the orientations of neighboring words according to an embodiment of the invention.

FIG. 9 depicts an exemplary embodiment of a method for adjusting a word's orientation based upon the orientations of neighboring words according to an embodiment of the invention. To speed the identification of neighboring words, the words may be indexed (905). In one embodiment, the words may be indexed by forming a grid and identifying each word that exists in whole or in part within each cell. In an embodiment, the grid may be the same grid as the letter index grid; or alternatively, the word index grid may be different than the letter index grid. One skilled in the art shall recognize that no specific indexing or grid configuration is critical to the present invention.

Using the index, neighboring words of a word may be quickly identified (910). In an embodiment, the neighbors may represent the K-nearest neighbors (KNN) of a word. One or more of the neighboring words may be used (915) to smooth the orientation of the word. In an embodiment, the new orientation of a query word may be set as the average (mean, median, or mode) orientation of the K-nearest neighboring word rectangles. In an embodiment, the average orientation calculation may include the orientation of the query word.

Figure 11:
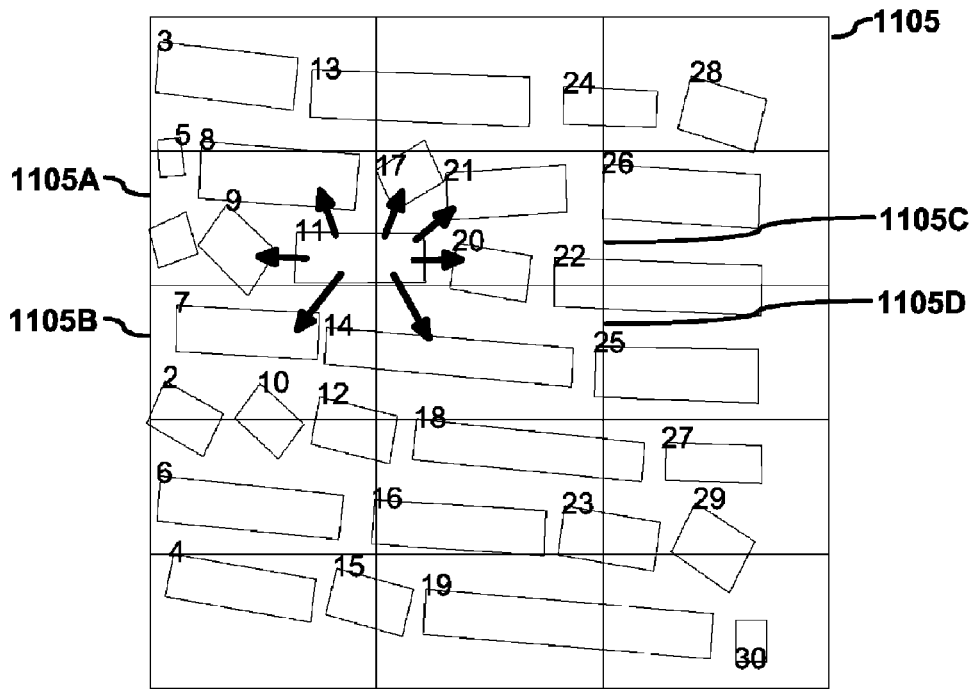
FIG. 11 depicts, for purposes of illustration, the neighborhood of indexed word rectangles that may be used to adjust a word's orientation according to an embodiment of the invention.
Figure 12:
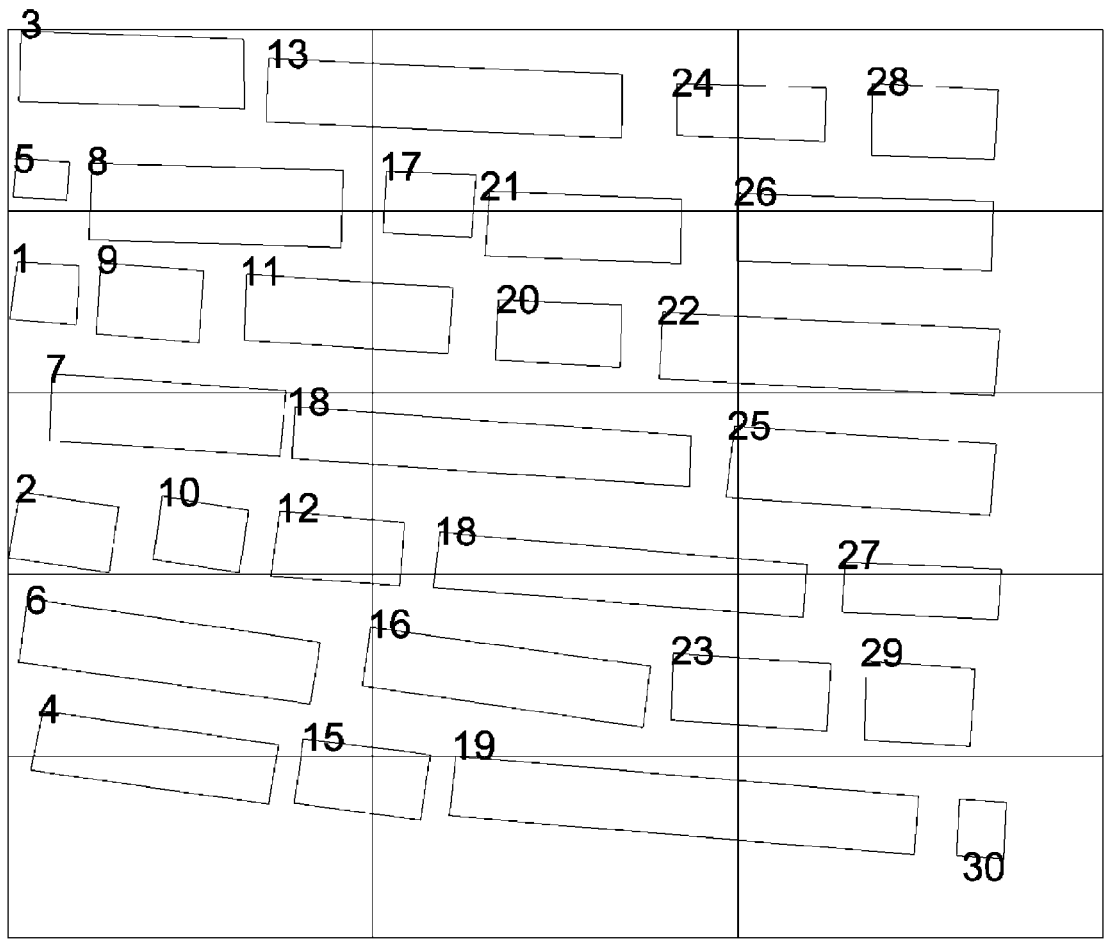
FIG. 12 depicts, for purposes of illustration, the word rectangles of FIG. 11 after the orientation of the word rectangles have been smoothed according to an embodiment of the invention.

Consider, by way of illustration and not limitation, the following example. FIG. 11 depicts a neighborhood of indexed word rectangles that may be used to adjust a word's orientation according to an embodiment of the invention. Assume for purposes of this example that the query word is the word with label 11. Because the words have been indexed, the cell location of word 11 is known; that is, word 11 may be associated with cells 1105A-1105D. By searching the words indexed or associated with those cells (1105A-1105D), the nearest neighbors of may be quickly identified. In the example illustrated in FIG. 11, the K-nearest neighbors (KNN) of word 11 have been identified as the words with labels 7, 8, 9, 14, 17, 20, and 21. In an embodiment, the new orientation of word 11 may be set as the average of the orientations of the KNN word rectangles (i.e., words 7, 8, 9, 14, 17, 20, and 21), which may or may not include the orientation of the query word (i.e., word 11). The results of orientation smoothing are shown in FIG. 12. FIG. 12 depicts the word rectangles of FIG. 11 after the orientation of the word rectangles have been smoothed according to an embodiment of the invention. Note, for example, the orientation of labeled words 2, 9, and 10. The orientations of those labeled words have been smoothed to better align with neighboring labeled words.

7. Fast Word Grouping

Figure 13:
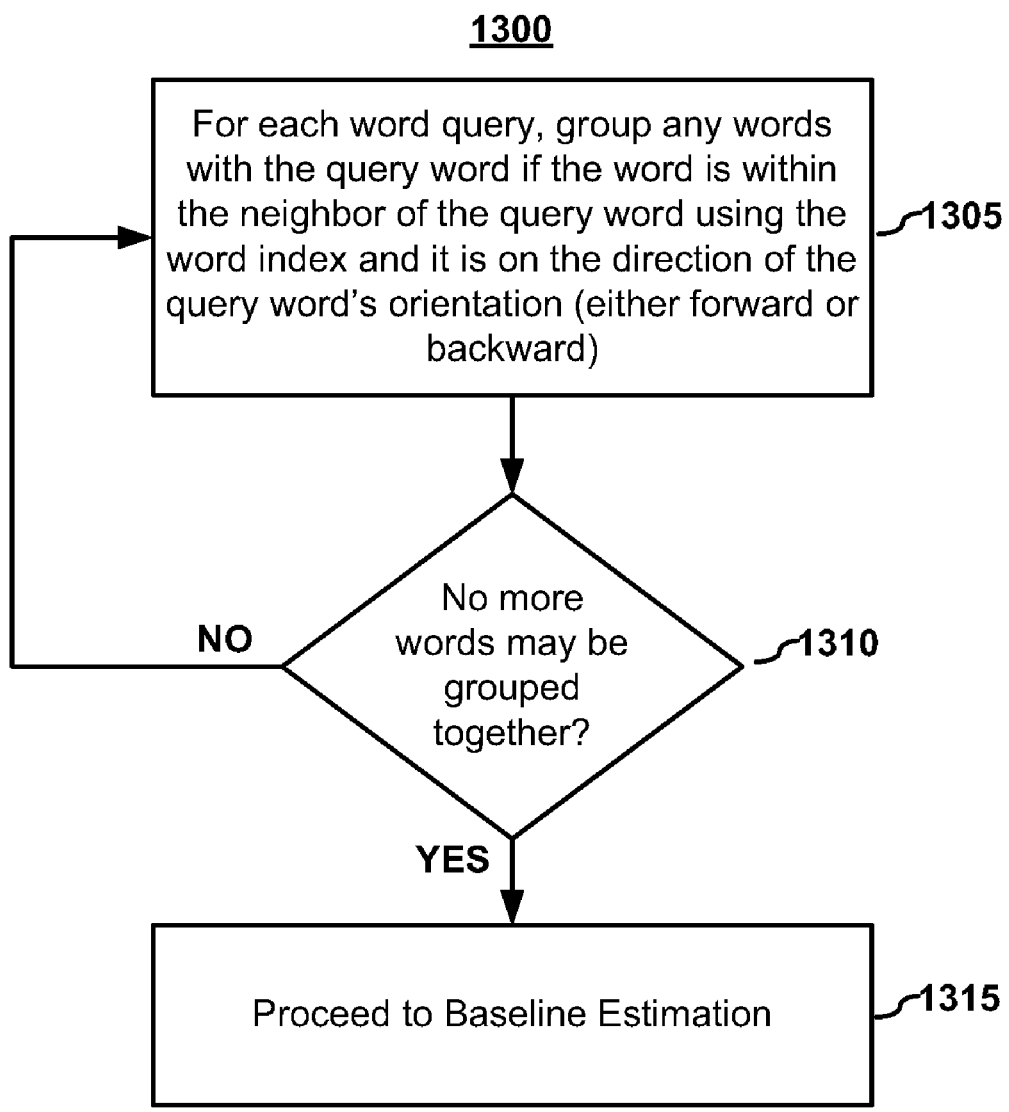
FIG. 13 depicts an exemplary method for grouping words of an input image into baseline groups using the indexed words according to an embodiment of the invention.

In embodiments, fast word grouper 245 may receive as an input the word information, including the smoothed orientations, and output grouped word labels, or baselines. FIG. 13 depicts an exemplary method for grouping words of an input image into baseline groups using indexed words according to an embodiment of the invention, which may be performed by fast word grouping module 245.

As illustrated in the embodiment depicted in FIG. 13, for each word query, any words may be grouped (1305) with the query word if the word is within the neighborhood of the query word, and if it is on the direction of the query word's orientation (either forward or backward). In an embodiment, a word may be on the query word's direction if a projection extending from the query word along its orientation intersects at least a portion of a word in the neighborhood of the query word. In an embodiment, the word index may be used to rapidly identify words within a neighborhood, such as the K-nearest neighborhood, of the query word. In an embodiment, the grouping may be iteratively performed until no more groups may be formed (1310). When the word grouping has concluded, the grouped words, or baselines, may be used (1315) for baseline estimation processing.

Figure 14:
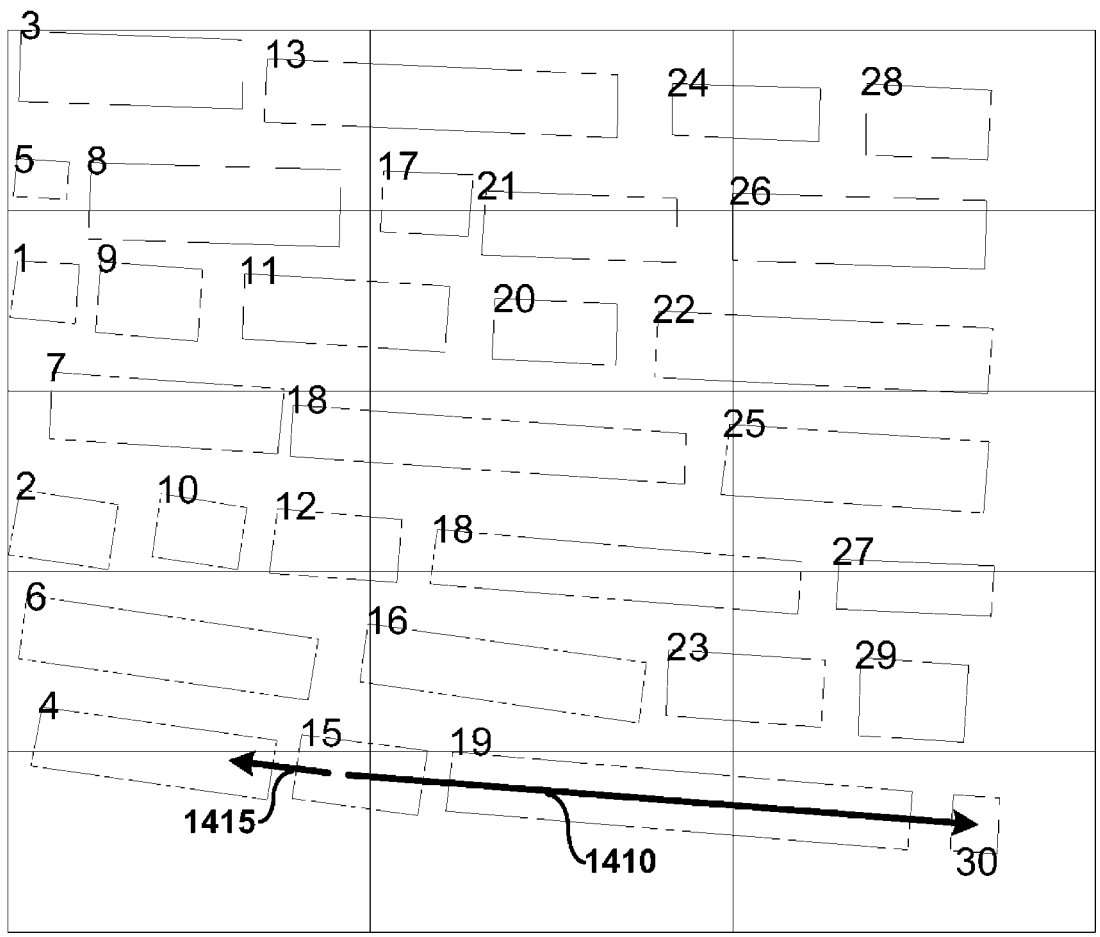
FIG. 14 graphically depicts, for purposes of illustration, a method for grouping indexed word rectangles into baseline groups according to an embodiment of the invention.

For purposes of illustration and not limitation, FIG. 14 graphically depicts a method for grouping indexed word rectangles into baseline groups according to an embodiment of the invention. As shown in FIG. 14, if query word 15 were projected forward 1410 and backward 1415 along its orientation, words 4, 19, and 30 would intersect or otherwise align with those projections. Thus, the query word 15 may be grouped with the words 4, 19, and 30. It shall be noted that one skilled in the art shall recognize that other methods for grouping the words into baselines may also be employed.

8. Document Layout and Baseline Estimator

Figure 15:
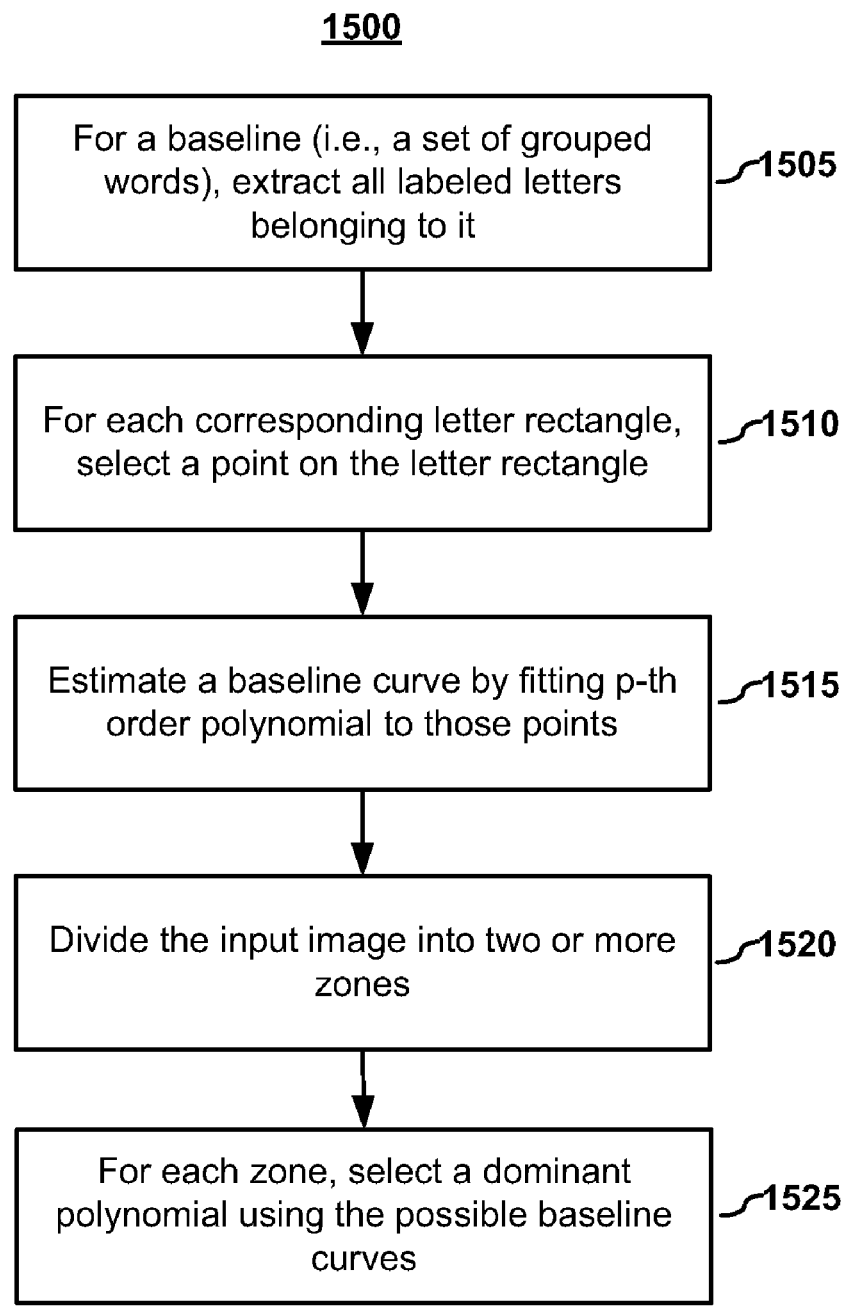
FIG. 15 depicts an exemplary method for obtaining one or more dominant functions from extracted baselines according to an embodiment of the invention.

In an embodiment, the image, letter information, word information, and baseline information may be provided to a document layout and baseline estimator 250. FIG. 15 depicts an exemplary method, which may be performed by document layout and baseline estimator 250, for selecting one or more dominant polynomials from the extracted baselines according to an embodiment of the invention. In one embodiment, for any query baseline, all letter labels belonging to the baseline may be extracted (1505). For each corresponding letter rectangles, a point on the letter rectangle may be selected (1510). In an embodiment, the point for the letter rectangles may be a point on the bottom-mid of the letter rectangle, or alternatively may be a centroid of the letter rectangle. A baseline function (or curve) may be estimated for the baseline by fitting (1515) a p-th order polynomial to those points. It shall be noted that other functions may be used to fit to the baseline points.

In embodiments, to counteract or reduce effects of imperfections in the word grouping, the input image may be divided (1520) into different zones. For each zone, one or more dominant polynomials may be computed (1525) out of the possible baseline functions. In an embodiment, the number of zones and the layout of the zones may be preset, user selected, or automatically selected. In an embodiment, the number of zones may be set (by way of example) to 2 or 3 zones.

In an embodiment, the baselines may be fit to second order polynomial. For example, the baselines may be fit to a polynomial of the following format: $y=a_n x^2 + b_n x + c_n$. In an embodiment, each baseline curve may be mapped into a two-dimensional point, $(a_n, b_n)$, in a feature space. In an embodiment, for a zone, a dominant baseline may be selected as the baseline whose two-dimensional feature point is closest in Euclidean distance to the baselines' corresponding two-dimensional feature points. In an embodiment, the baseline whose two-dimensional feature point is closest in Euclidean distance may be selected from existing baseline feature points or may be calculated. For example, in an embodiment, for a zone, a dominant baseline may be selected as the average (mean, media, or mode) or a robust-mean of the two-dimensional points in the feature space.

9. Unwarping

The unwarper 255 may receive as an input the image and the dominant baseline functions for all zones, if the image was divided into multiple zones. The characteristics of the baseline functions may then be used to unwarp the image, thereby straightening the baselines to obtain the output image 260. It shall be noted that, in embodiments, the unwarping may be applied only to the foreground pixels of the image as the background may be assumed to be a set color and may be used to fill the pixels not occupied by unwarped foreground pixels.

Figure 16:
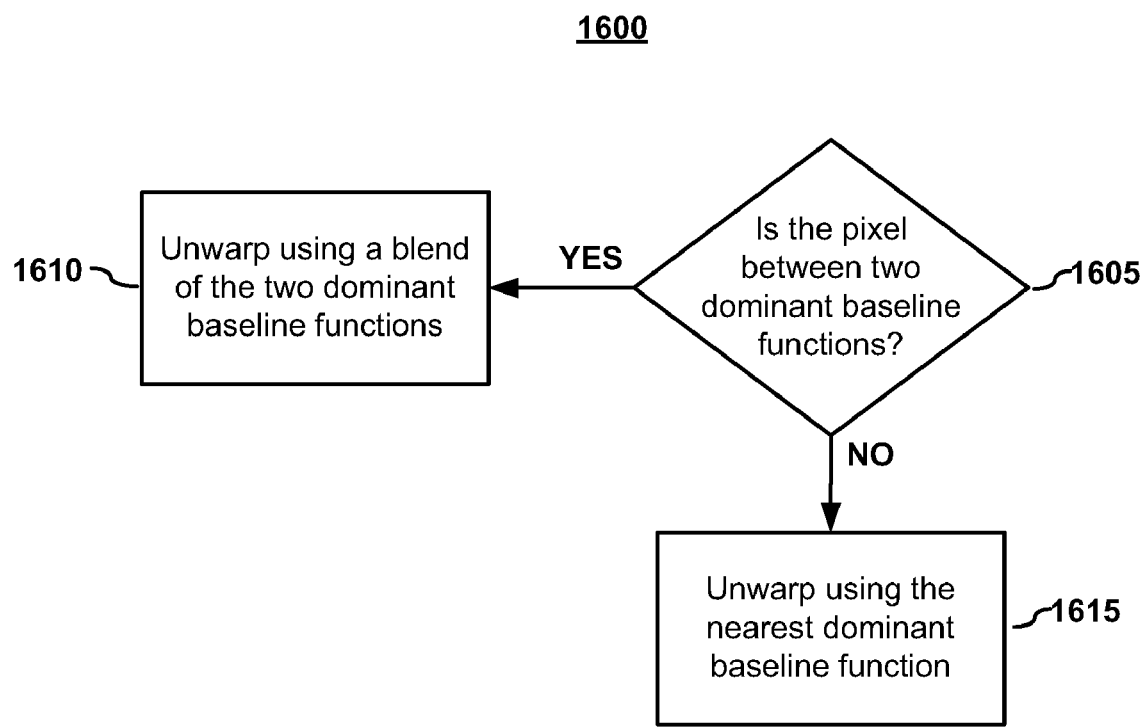
FIG. 16 depicts an exemplary method for unwarping an image using one or more dominant functions according to an embodiment of the present invention.

FIG. 16 depicts a method for unwarping an image using dominant baseline according to an embodiment of the present invention. In an embodiment, if a pixel lies (1605) between two dominant baseline functions, the unwarping may be obtained (1610) by blending those two dominant baselines. In an embodiment, the blending of the two dominant baselines may be weighted with more weight applied to the closer of the two baseline functions. Thus, the location of this pixel in the output image may be obtained using the blended baselines.

A pixel that is not between two dominant baselines may be unwarped (1615) using the nearest dominant baseline. In an embodiment, the unwarping may include an adjustment for the shift between the pixel location and the dominant baseline. One skilled in the art shall recognize that by using only a few regional or zone baselines rather than every baseline, the unwarping is less computationally intensive and faster.

Figure 17:
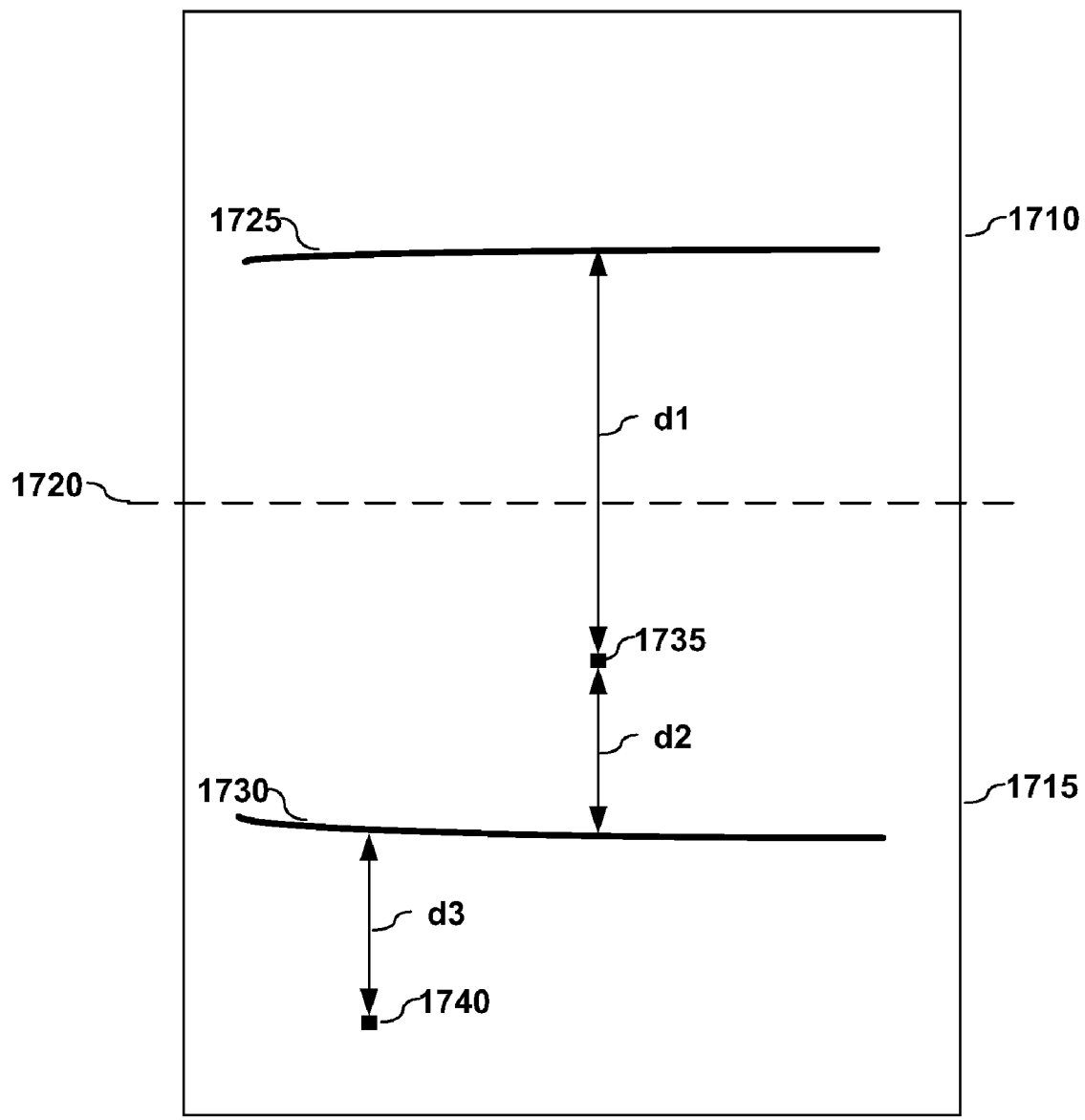
FIG. 17 graphically an exemplary method for unwarping an image using dominant polynomials according to an embodiment of the present invention.

FIG. 17 graphically depicts a method for unwarping an image using dominant baseline polynomials according to an embodiment of the present invention. Consider the scanned image 1705 that has been divided (1720) into two zones 1710, 1715. Each zone has a dominant baseline function 1725, 1730 (respectively). For a pixel between the two dominant baselines, the pixel, such as pixel 1735, may be unwarped using a blend of the two dominant baseline polynomials 1725, 1730. In an embodiment, the blend may be a weighted blend based upon the pixel's location between the two dominant baselines 1725, 1730. For example, in an embodiment, the weighted factor for the dominant baseline 1725 may be:

$$w_1 = \frac{d2}{d1+d2},$$

and the weighted factor for the dominant baseline 1730 may be:

$$w_2 = \frac{d1}{d1+d2}.$$

If the pixel is not between to dominant baselines, such as pixel 1740, the pixel may be unwarped by using the characteristics of the closest dominant baseline functions, in this illustrated case, baseline 1730. In an embodiment, the distance, d3, the pixel 1740 is from the dominant baseline 1730 may be used as a shift when applying the dominate baseline characteristics. One skilled in the art shall recognize other methods for applying one or more function characteristics to unwarp the document or a portion thereof.

C. Sample Results

Figure 20:
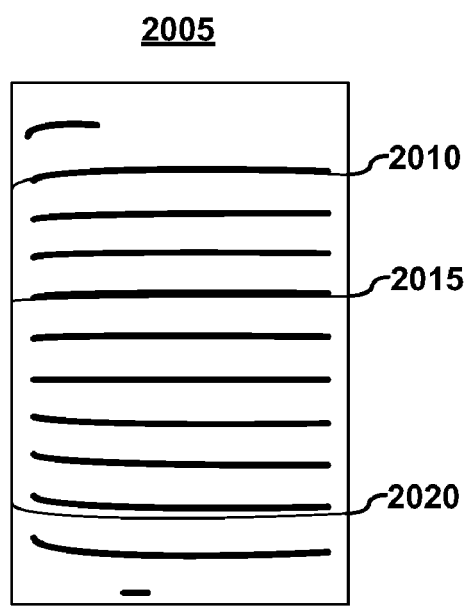
FIG. 20 depicts the exemplary binarized input image of FIG. 19 wherein three dominant baselines have been identified according to an embodiment of the present invention.
Figure 21:
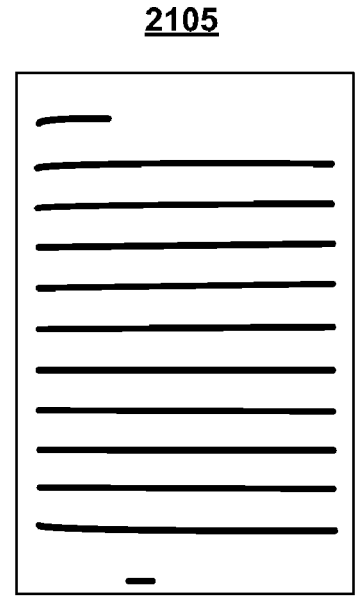
FIG. 21 depicts a reduced-distortion image of the exemplary scanned input image of FIG. 18 after it has been processed according to an embodiment of the present invention.

FIGS. 18-21 graphically illustrates sample results of removing distortion according to the teachings of the present invention. FIG. 18 depicts a scanned input image that exhibits distortion from both shading 1810 and warping 1815. FIG. 19 depicts the scanned input image of FIG. 18 that has been binarized according to an embodiment of the present invention. In this image, the shade along side of the image has been reduced or removed. FIG. 20 depicts the binarized input image of FIG. 19 wherein three dominant baselines (one for each zone) have been selected according to an embodiment of the present invention. FIG. 21 depicts a reduced-distortion image of the scanned input image of FIG. 18 after it has been processed according to an embodiment of the present invention.

One skilled in the art shall recognize that application of the teachings of the present invention can produce good results in removing distortion in an input image. One skilled in the art shall also recognize that the teachings of the present invention may be embodied in methods and systems that are computationally fast.

Aspects of the present invention may be implemented in any device or system or combination of devices or systems capable of performing according to the teachings of the present invention. Such devices and/or systems include, but are not limited to, a computer or a device with one or more processors. Furthermore, within any of the systems or devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application-specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method for reducing distortion in an image comprising pixels, the method comprising:
    segmenting the image into foreground pixels and background pixels;
    applying a connected component analysis to the foreground pixels to obtain letters;
    indexing a location for each of the letters;
    forming words using the indexed letters to identify a neighborhood of letters for a query letter and forming into a word the letters from the neighborhood of letters that are less than a threshold distance apart;
    estimating a location and orientation for each word and indexing the location of each word;
    forming baselines using the indexed words to identify a neighborhood of words for a query word and forming into a baseline the words from the neighborhood of words that lay on a projection of the query word along its orientation;
    fitting a corresponding function to each of the baselines;
    selecting two or more dominant baselines;
    responsive to a pixel in the image being located between two dominant baselines, unwarping the pixel by blending the two functions respectively fitted to the two dominate baselines; and
    responsive to a pixel in the image not being located between two dominant baselines, unwarping the pixel in relation to the function of a nearest dominant baseline and a shift related to a distance between the pixel's location and the function of the nearest dominant baseline.

2. The method of claim 1 wherein the step of segmenting the image into foreground pixels and background pixels comprises:
    using adaptive binarization to segment the image into foreground and background pixels; and
    setting foreground pixels to one color and setting background pixels to another color.

3. The method of claim 1 wherein the step of indexing a location for each of the letters comprises the steps of:
    fitting a region to each letter;
    labeling each of the letter regions; and
    forming a letter indexing grid and indexing a location of each of the letter regions according to its position within the letter indexing grid.

4. The method of claim 3 further comprising the step of:
    responsive to the distance between letter regions being less than a single letter threshold value, treating the letters of the letter regions as a single letter.

5. The method of claim 3 wherein the step of fitting a corresponding function to each of the baselines comprises the steps of:
    for a query baseline, extracting the letter regions belonging to the query baseline and selecting a point on each letter region; and
    fitting a function to the points.

6. The method of claim 1 wherein the step of estimating a location and orientation for each word and indexing the location of each word comprises the steps of:
    fitting a region to a word;
    forming a word indexing grid and indexing a location of each of the word regions according to its position within the word indexing grid.

7. The method of claim 6 wherein the step of fitting a region to a word comprises the steps of:
    fitting an ellipse to the letters that form the word; and
    fitting a rectangle to the ellipse to form a word rectangle, wherein the orientation of the rectangle is used as the word's orientation.

8. The method of claim 7 further comprising the steps of:
    adjusting the orientation of a word based upon the orientations of neighboring words.

9. The method of claim 8 wherein the step of adjusting the orientation of a word based upon the orientations of neighboring words comprising the steps of:
    using the indexed word regions to identify a neighborhood of word rectangles for a query word rectangle;
    adjusting the orientation of the query word rectangle to an average orientation obtained using the orientations of the neighboring word rectangles.

10. The method of claim 1 wherein the step of selecting one or more dominant baselines comprises the steps of:
    for each of a plurality of zones into which the image is divided:
        mapping each baseline-fitted function into a corresponding two-dimensional feature point in a two-dimension feature space; and selecting as a dominant baseline a baseline whose associated two-dimensional feature point is closest in Euclidean distance to the two-dimensional feature points of the zone.

11. A non-transitory tangible-readable medium comprising one or more sequences of instructions to direct an instruction-executing device to perform at least the steps of claim 1.

12. A method for reducing distorting in an image comprising pixels, the method comprising:

binarizing the image;

utilizing a binary-wise connected-component analysis on the binarized image to obtain segmented letters;

labeling the segmented letters;

dividing the image into letter index segments and indexing each labeled letter's location relative to the letter index segments;

for a labeled letter, assigning the labeled letter to a labeled word by using the indexed labeled letters to identify a neighborhood of labeled letters and forming into a word the labeled letters from the neighborhood of labeled letters that are less than a threshold distance apart;

for each labeled word, estimating a labeled word rectangle location and orientation by fitting an ellipse to an image formed by the labeled letters that comprise the labeled word;

dividing the image into word index segments and indexing each labeled word's location relative to the word index segments;

smoothing a labeled word orientation based upon the orientations of at least some of the neighboring labeled words;

forming baselines using the indexed words to identify a neighborhood of words for a query word and forming into a baseline the words from the neighborhood of words that lay on a projection of the query word along its orientation;

fitting a corresponding function to each of the baselines;

selecting two or more dominant baselines; and responsive to a pixel in the image being located between two dominant baselines, unwarping the pixel by blending the two functions respectively fitted to the two dominate baselines; and responsive to a pixel in the image not being located between two dominant baselines, unwarping the pixel in relation to the function of a nearest dominant baseline and a shift related to a distance between the pixel's location and the function of the nearest dominant baseline.

13. The method of claim 12 wherein the step of fitting a corresponding function to each of the baselines comprises the steps of:

for a query baseline, extracting the labeled letters belonging to the query baseline and selecting a point on each labeled letters; and fitting a polynomial to the points.

14. The method of claim 12 wherein the step of selecting one or more dominant baselines comprises the steps of:

for each of a plurality of zones into which the image is divided:

mapping each baseline-fitted function into a corresponding two-dimensional feature point in a two-dimension feature space; and selecting as a dominant baseline a baseline whose associated two-dimensional feature point is closest in Euclidean distance to the two-dimensional feature points of the zone.

15. A non-transitory tangible-readable medium comprising one or more sequences of instructions to direct an instruction-executing device to perform at least the steps of claim 12.

16. A system for reducing distortion in an image comprising pixels, the system comprising:

a preprocessor, coupled to receive the image, that binarizes the image into foreground and background pixels;

a labeler, coupled to receive information from the preprocessor, that forms the foreground pixels into letters;

a document image layout extraction system, coupled to receive information from the labeler, that forms the letters into indexed letter regions, uses index-based searching to form the indexed letter regions into indexed words, and uses index-based searching to form the indexed words into baselines;

a document layout and baseline estimator, coupled to receive information from the document image layout extraction system, that fits a corresponding function to each of the baselines and selects two or more dominant baselines; and an unwarper, coupled to receive information from the document image layout extraction system, that:

responsive to a pixel in the image being located between two dominant baselines, unwarps the pixel by blending the two functions respectively fitted to the two dominate baselines; and responsive to a pixel in the image not being located between two dominant baselines, unwarps the pixel in relation to the function of a nearest dominant baseline and a shift related to a distance between the pixel's location and the function of the nearest dominant baseline.

17. The system of claim 16 wherein the document image layout extraction system comprises:

a letter segmenter, coupled to receive information from the labeler, that forms a region around each letter, labels each region, forms a letter indexing grid, and indexing a location of each of the labeled letter regions according to its position within the letter indexing grid;

a fast word segmenter, coupled to receive information from the letter segmenter, that forms words using the indexed letter regions to identify a neighborhood of letters for a query letter and forms into a word the letters from the neighborhood of letters that are less than a threshold distance apart;

a word orientation estimator, coupled to receive information from the fast word segmenter, that estimates a location and orientation for each word and indexes the location of each word; and a fast word grouper, coupled to receive information from the labeler, that forms baselines using the indexed words to identify a neighborhood of words for a query word and forms into a baseline the words from the neighborhood of words that lay on a projection of the query word along its orientation.

18. The system of claim 17 wherein the document image layout extraction system further comprises:

an orientation smoother, coupled to receive information from the word orientation estimator and to provide information to the fast word grouper, that adjusts the orientation of a word based upon the orientations of at least some of its neighboring words.

19. The system of claim 16 wherein the document layout and baseline estimator fits a function to a baseline by performing the steps comprising:

for a query baseline, extracting the letter regions belonging to the query baseline and selecting a point on each letter region; and fitting a function to the points.

20. The system of claim 16 wherein the document layout and baseline estimator selects one or more dominant baselines by performing the steps comprising:

for each of a plurality of zones into which the image divided:

mapping each baseline-fitted function into a corresponding two-dimensional feature point in a two-dimension feature space; and selecting as a dominant baseline a baseline whose associated two-dimensional feature point is closest in Euclidean distance to the two-dimensional feature points of the zone.

* * * * *